United States Patent
Jordan et al.

(10) Patent No.: US 11,165,807 B2
(45) Date of Patent: Nov. 2, 2021

(54) SYSTEM AND METHOD FOR ASSIGNING THREAT VALUATIONS TO NETWORK EVENTS AND SECURITY EVENTS

(71) Applicant: Fluency Corp., College Park, MD (US)

(72) Inventors: Christopher Jordan, Great Falls, VA (US); Kun Luo, Ellicott City, MD (US)

(73) Assignee: FLUENCY CORP., College Park, MD (US)

( * ) Notice: Subject to any disclaimer, the term of this patent is extended or adjusted under 35 U.S.C. 154(b) by 614 days.

(21) Appl. No.: 16/016,061

(22) Filed: Jun. 22, 2018

(65) Prior Publication Data

US 2018/0375893 A1  Dec. 27, 2018

Related U.S. Application Data

(60) Provisional application No. 62/622,593, filed on Jan. 26, 2018, provisional application No. 62/525,025, filed on Jun. 26, 2017.

(51) Int. Cl.

| H04L 29/06 | (2006.01) |
|---|---|
| G06N 20/00 | (2019.01) |
| H04L 12/24 | (2006.01) |
| G06N 5/04 | (2006.01) |

(52) U.S. Cl.
CPC ......... *H04L 63/1433* (2013.01); *G06N 5/046* (2013.01); *G06N 20/00* (2019.01); *H04L 41/0631* (2013.01); *H04L 63/20* (2013.01); *G06N 5/045* (2013.01); *H04L 41/16* (2013.01)

(58) Field of Classification Search
CPC . H04L 63/1433; H04L 41/0631; H04L 63/20; H04L 41/16; G06N 5/046; G06N 20/00; G06N 5/045
See application file for complete search history.

(56) References Cited

U.S. PATENT DOCUMENTS

| 8,479,297 | B1 * | 7/2013 | Edukulla | ............. H04L 63/1433 726/25 |
|---|---|---|---|---|
| 9,336,287 | B2 | 5/2016 | Jordan et al. | |
| 10,122,748 | B1 * | 11/2018 | Currie | ................. H04L 63/1441 |
| 2006/0026688 | A1 * | 2/2006 | Shah | ....................... H04L 41/28 726/25 |
| 2009/0030756 | A1 * | 1/2009 | Riley | ..................... G06Q 10/10 705/7.11 |

(Continued)

FOREIGN PATENT DOCUMENTS

CN          108494727  A  *  9/2018

OTHER PUBLICATIONS

Carnegie Mellon University, "Threatsand Risk Calculation", Retrieved From https://fedvte.usalearning.gov/courses/Security+_v401/course/ videos/pdf/Security+_v401_D03_S01_T03_STEP.pdf, published Jun. 19, 2017 (Year: 2017).*

*Primary Examiner* — Chau Le
(74) *Attorney, Agent, or Firm* — Slater Matsil, LLP

(57) ABSTRACT

A method including receiving a record in a first timeframe; establishing a plurality of threat vectors for the record; merging the plurality of threat vectors to the record; generating a risk valuation for the record based on the plurality of threat vectors; merging the risk valuation to the record to form a risk event; and storing the risk event in a computer-readable data store.

20 Claims, 5 Drawing Sheets

(56) References Cited

U.S. PATENT DOCUMENTS

| | | | |
|---|---|---|---|
| 2015/0088868 A1* | 3/2015 | Jordan | G06F 16/284 707/722 |
| 2015/0350252 A1* | 12/2015 | Chang | H04L 63/20 726/22 |
| 2016/0226905 A1* | 8/2016 | Baikalov | H04L 63/1408 |

* cited by examiner

SYSTEM AND METHOD FOR ASSIGNING THREAT VALUATIONS TO NETWORK EVENTS AND SECURITY EVENTS

CROSS-REFERENCE TO RELATED APPLICATIONS

This application claims the benefit of U.S. Provisional Application No. 62/525,025, filed on Jun. 26, 2017 and entitled "Method and System for Validation of Security Alerts," and U.S. Provisional Application No. 62/622,593, filed on Jan. 26, 2018 and entitled "System and Method for Assigning Threat Valuations to Network Events and Security Events," which applications are hereby incorporated herein by reference.

TECHNICAL FIELD

The present invention relates generally to a method, device, and system for enhancing analysis of security and network events, and, in particular embodiments, to a method, device, and system for merging network and security events and assigning a threat valuation to each merged event.

BACKGROUND

The management of security information and security events (i.e., cyber security) relies on security analysts who review hundreds of thousands of events in the form of logs and alerts. The volume of events that is required to be reviewed is substantial to the point that not all events can be reviewed properly. The bottleneck of information has created an information overload. The conventional approach to cyber security is focused on a cause-and-event chain of actions. When a critical or key event requiring immediate action is discovered, an investigation begins to validate the critical event. Once the event is validated, a customer is notified. Disadvantages of this conventional process include reliance on the expertise of analysts, an unpredictable time delay, the expense of monitoring, the information overload, and critical events may be missed.

SUMMARY

General aspects of the disclosure herein describe a method, a system, and a device for merging network and security events into records, producing threat vectors for the records, producing risk values and risk factors (collectively referred to as risk factors) for related records, and notifying users of records having sufficiently high risk factors so that users may act upon the records. The risk factors are is the product of a system that scores multiple related threat vectors of multiple dimensions to a single vector of one dimension. Each risk factor is a single value that represents the distance of the impact of related network and security events and the confidence of the events.

In accordance with an embodiment, a method includes receiving a record in a first timeframe; establishing a plurality of threat vectors for the record; merging the plurality of threat vectors to the record; generating a risk valuation for the record based on the plurality of threat vectors; merging the risk valuation to the record to form a risk event; and storing the risk event in a computer-readable data store. In an embodiment, the record includes a derived key. In an embodiment, the derived key is based a source IP, a destination IP, a protocol, or a combination thereof. In an embodiment, the record includes a plurality of events and attribute-value pairs in the first timeframe which share the derived key. In an embodiment, the plurality of threat vectors includes statistics evaluations, flow anomalies, reputation information, alerts based on other network security systems, or a combination thereof. In an embodiment, the method further includes notifying a user of the risk event if the risk valuation of the risk event is above a predetermined threshold value. In an embodiment, the method further includes optimizing each threat vector of the plurality of threat vectors based on machine learning. In an embodiment, the risk valuation corresponds to a joint-distribution probability of the threat factors merged to the record.

In accordance with another embodiment, a method includes receiving or retrieving a plurality of events in a first timeframe, each of the events comprising a plurality of attribute-value pairs; deriving a first key for each event of the plurality of events; superimposing each event of the plurality of events having a same first key into a record to form a plurality of records; superimposing a plurality of threat factors to each record of the plurality of records; calculating a threat valuation for each record of the plurality of records based on the plurality of threat factors superimposed to the respective record of the plurality of records; and generating a risk event for each record of the plurality of records if the threat valuation is above a predetermined threshold value; and storing the risk events in a computer-readable data store. In an embodiment, the method further includes creating a new record when the first key for one of the events of the plurality of events does not match the first key for one of the records of the plurality of records in the first timeframe. In an embodiment, each of the events of the plurality of events includes a source IP and a destination IP, each of the events of the plurality of events having the same source IP and the same destination IP has the same first key, and each of the events of the plurality of events having the same first key is superimposed into a record of the plurality of records. In an embodiment, the first key for each event of the plurality of events is determined based on the plurality of attribute-value pairs for the respective event. In an embodiment, each record of the plurality of records includes N threat factors, the threat valuation for each record being a product of the threat factors and a non-linear multiplier based on the value of N, and the method further includes displaying a predetermined number of the risk events of the plurality of risk events having the greatest threat valuations in a window. In an embodiment, the method further includes notifying a user of a predetermined number of the risk events having the greatest threat valuations. In an embodiment, the method further includes displaying the risk events having threat valuations greater than a predetermined value.

In accordance with yet another embodiment, a device includes a system that receives or retrieves a plurality of events in a sliding window; a processor that forms a plurality of security events by merging each event sharing an IP-couple-pair into a record to form a plurality of records, merging a plurality of threat factors to each record of the plurality of records, and merging a risk score to each record of the plurality of records based on the threat factors present in the respective record of the plurality of records to form the plurality of security events; and a computer readable data store that stores the plurality of security events. In an embodiment, each of the events has a source IP and a destination IP, and events having the same source IP and the same destination IP have a same IP-couple-pair. In an embodiment, the device further includes a monitor adapted to display the plurality of security events. In an embodiment, the monitor displays a predetermined number of the security events of the plurality of security events, each of the predetermined number of the security events having the highest risk score and being sorted by risk score. In an embodiment, the monitor displays the record, the IP-couple-pair, the risk score, the plurality of threat factors, or a combination thereof for each security event of the predetermined number of the security events.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
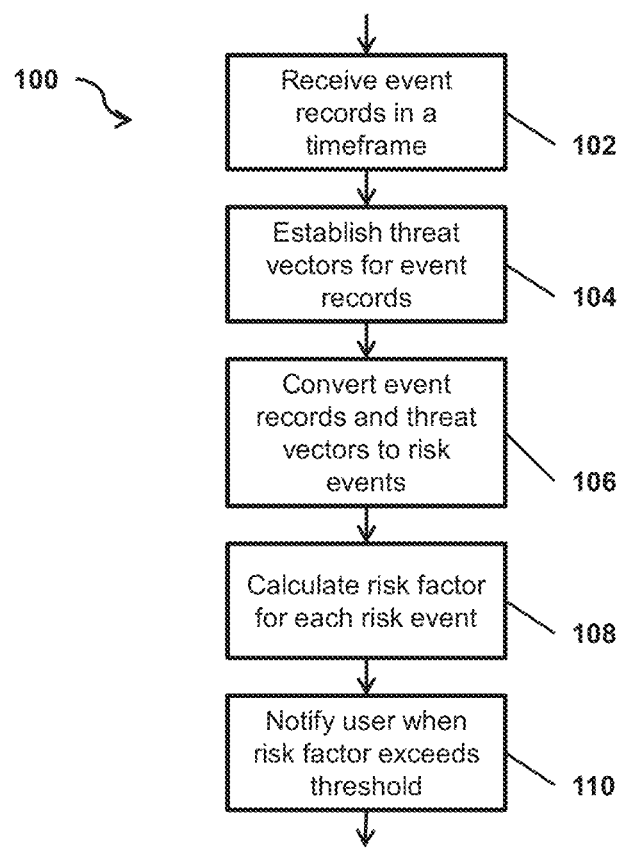
FIG. 1 is a flow diagram a method for evaluating events in accordance with an embodiment.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

In cyber security, events are any changes in the operation of a network. However, events are not limited to a network and may occur in any device, on the Cloud, or the like. Adverse events are events which may harm a network including security policy violations, failure of security safeguards, unauthorized use of the network, unauthorized access to sensitive data, execution of malware, bad or suspicious activity on the network, and the like. Likewise, security incidents are events in which a network, systems, or data are compromised, security measures fail, and normal operations are disrupted. Adverse events/security incidents may include any anomalies to a correctly operating system and may be caused by, or the result of, faults present in a security posture (e.g., an overall security strength of a network). In some embodiments, this method may use fault prediction to group related faults together in clusters and to validate each of the clusters in order to determine whether an adverse event has occurred. Thus, fault prediction is used as a means to validate and score security events.

Alerts are notifications that an event has occurred. Security logs store information relevant to security management, including a history of alerts and events. Alerts may be generated from various sources, including firewalls, anti-virus systems, intrusion detection systems, intrusion prevention systems, anti-malware systems, operating systems, applications, workstations, switches, routers, and the like. Each alerting system may include a unique vector which may be used to determine that an issue has occurred. As will be discussed in further detail below, the information contained in the security logs may enter a threat valuation system in step 102 of a method 100 for assigning risk factors to network and security events. Records (e.g., alerts, events, and the like) that enter the threat valuation system may include both raw information and derived information.

Conventional approaches to cyber security use analysts who review hundreds of thousands of events in the form of logs and alerts in order to identify those events that require a response. This approach is talent and time-intensive, expensive, and unreliable. Moreover, as information systems have been rapidly increasing in the amount of information processed and stored, the amount of audit data used to track network, host, cloud, and other security events has rapidly increased as well. This has resulted in an information overload, which hinders the ability of current systems and approaches to detect security events.

Some other conventional cyber security approaches use rule-based systems in which a key event triggers a validation process. The validation processes relies on supporting events occurring after the key event and are therefore dependent on the order in which events are received and timestamps attached to the events. Timestamps can be incorrect and different systems may alert at different points in a conversation (e.g., the start, the middle, or the end), thus, rule-based systems are prone to error. In contrast, embodiments of the present disclosure treat the order of events as irrelevant. As such, embodiments of the present disclosure may reduce errors.

Embodiments of the present disclosure provide a system and a method for assigning threat vectors (sometimes referred to as threat factors) to network events and security events and establishing an overall risk value (sometimes referred to as a risk factor a threat valuation, or a risk score) from the product of these threat vectors. Specifically, embodiments of the present invention may allow large amounts of data in varying formats to be collected, stored, analyzed, and assigned a threat vector. The threat vectors may be based on the probability of an anomaly occurring, the probability of harm to a network, the severity of any potential harm to the network, and the like. The risk value for a network event or a security event may be calculated by based on a joint-distribution probability of a set of threat vectors related to that network event or security event. According to some embodiments, only those network events or security events which have a risk value greater than a predetermined value may be displayed to a user. Thus, only relevant data is displayed to the user and the user is able to manage, analyze, and respond to greater amounts of information more quickly and without missing important information. As such, embodiments of the present disclosure allow for a more effective and complete analysis and response to security and network events to be provided. Furthermore, the user may implement automated actions based on the risk value.

FIG. 1 illustrates a flow diagram of a method 100 in accordance with a representative embodiment. The method 100 may be used to manage security information, such as network security logs, alerts, and events. More specifically, the method 100 may be used to assign a risk value to network events and/or security events (which may be referred to as event records) and notify a user of any event records having a risk value greater than a predetermined value.

In step 102 of the method 100, event records are received in a timeframe. The event records may be received from an external source (e.g., the event record may be pushed into the method 100), or the method 100 may retrieve the event record from an external source (e.g., the method 100 may pull the event record). The event records may be collected from network security devices, application flows, firewalls, anti-virus systems, intrusion detection systems, intrusion prevention systems, anti-malware systems, operating systems, applications, workstations, switches, routers, Active Directory (AD), Lightweight Directory Access Protocol (LDAP), High Availability Dynamic Host Configuration Protocol (HA-DHCP), security information and event management (SIEM) systems, or the like.

Each of the event records may include attributes and/or values for alerts and events and may further include a unique key (e.g., an IP-tuple, an IP-couple, or a subject identifier). In some events, event records may be merged or superimposed such that each event record includes all of the events and/or alerts sharing the same unique key in a timeframe. The key may include a source address/port (e.g., a source IP address), a destination address/port (e.g., a destination IP address), a protocol combination, combinations thereof, or the like. As an example, the key may include a source IP address and a destination IP address. In some embodiments, the source address/port may be referred to as a primary key and the destination address/port may be referred to as a secondary key.

Figure 2:
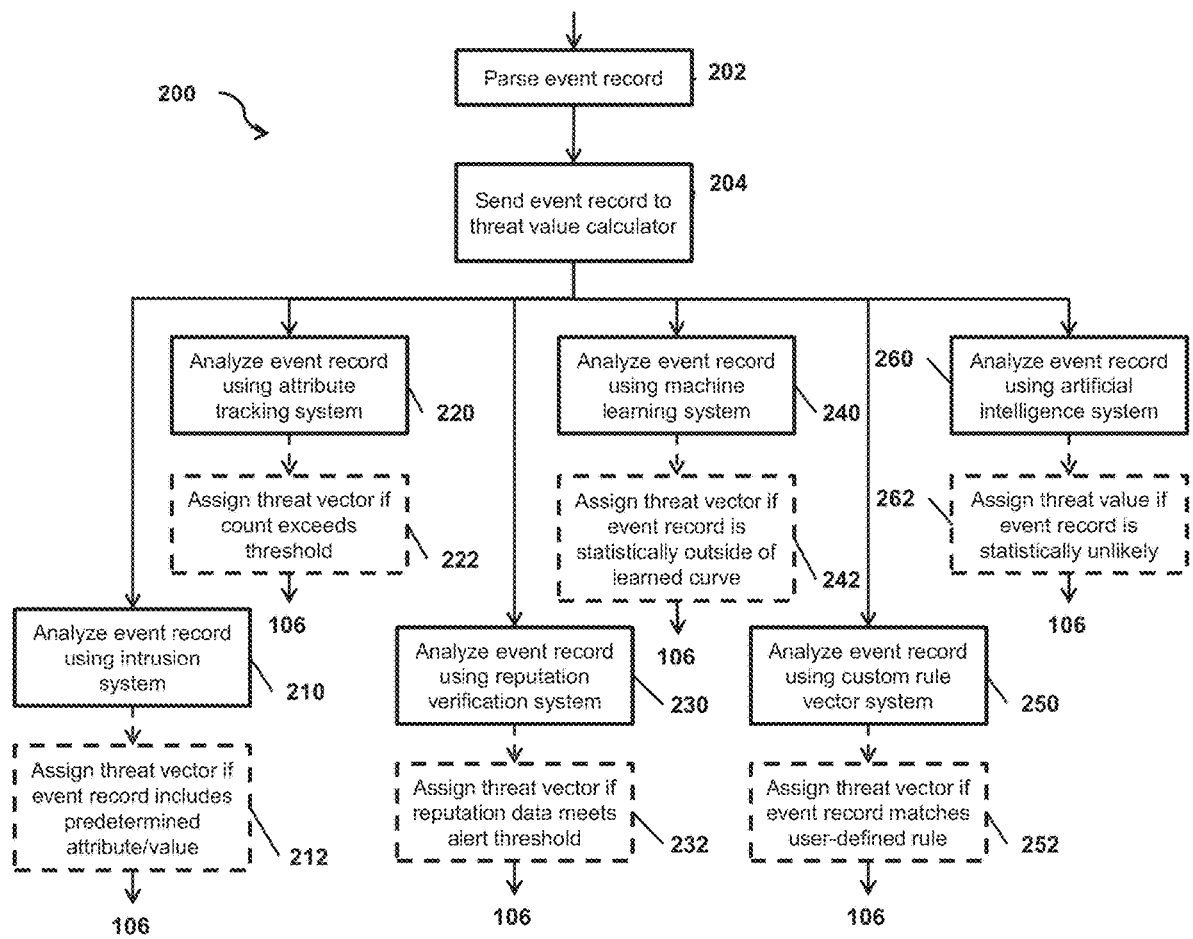
FIG. 2 is a flow diagram of a step of the method for evaluating events in accordance with an embodiment.

In step 104, threat vectors are established for each of the event records. FIG. 2 illustrates a method 200 providing details for step 104 of the method 100. In the method 200, the event records may be distributed to a plurality of systems or sub-methods, which are used to calculate the threat vectors. The threat vectors may indicate the severity of the event records and may be based on the probability of an anomaly occurring, the probability of harm to the network, the severity of any potential harm to the network, and the like.

As illustrated in FIG. 2, the method 200 begins with parsing an event record in step 202. Each of the event records may include strings of data which may be parsed in order to obtain attributes, values, attribute-value pairs, or the like. In step 204, once an event record is parsed, the event record is sent to various threat vector calculators. The threat vector calculators are used to assign threat vectors to each of the event records. The threat vector calculators may be a part of a threat valuation system, or may be external to the threat valuation system. The threat vector calculators may include intrusion systems (IPS), attribute tracking systems, reputation verification systems, machine learning systems, custom rule vector systems, artificial intelligence systems, or the like. Steps 210, 220, 230, 240, 250, and 260 provide details for sending the event records to an intrusion system, an attribute tracking system, a reputation verification system, a machine learning system, a custom rule vector system, and an artificial intelligence system, respectively. Once threat vectors are assigned through the steps 210, 220, 230, 240, 250, and 260, the threat vectors are sent to step 106 of the method 100.

In step 210, the event records are analyzed by an intrusion system. The intrusion system may include intrusion detection systems (IDS), intrusion prevention systems (IPS), and the like. An IDS is a system which monitors a network or system for malicious activity or policy violations and produces an alert if malicious activity or policy violations are found. An IPS is a system that detects dangerous content based on signatures or other identifiable patterns and may produce an alert when dangerous content is found, drop malicious data packets, block traffic from the source address, and/or reset the connection. The intrusion system may use methods such as signature-based detection, statistical anomaly-based detection, stateful protocol analysis detection, and the like to assess potential impacts and confidence for the event records and assign threat vectors to the event records. In step 212, the intrusion system may assign a threat value to an event record if the event record includes a previously derived attribute and/or value. Examples of intrusion systems include Cisco Firepower, FireEye, TrendMicro Deep Discovery Inspector (DDI), and the like. Once the intrusion system assigns threat vectors to the event records, the threat vectors are sent to step 106, illustrated in FIG. 1.

In step 220, the event records are analyzed by an attribute tracking system. Various attributes may be tracked for each of the event records and defined statistical thresholds may be assigned to each attribute for a given time period. A threat vector histogram may be used to set the threshold for the attributes to be tracked. Each time that a specified attribute or attribute-value pair is detected in an event record, a count may be increased. Once the count for an event record reaches the threshold, a threat vector may be assigned to the event record in step 222 and the threat vector may be sent to step 106, illustrated in FIG. 1. The attribute tracking system may assign a threat vector to an event record even if the count is below the threshold and may assign a different threat vector (e.g., a greater value) if the count exceeds the threshold. In some embodiments, the attribute tracking system may assign a threat vector to an event record which is proportional to the count. As an example, the attribute tracking system may track the number of failed login attempts made from a source address in a predetermined time period (e.g., 10 minutes) and assign a threat vector to an event record if the number of failed login attempts exceeds a threshold value (e.g., 20 attempts).

In step 230, the event records are analyzed by a reputation verification system. The reputation verification system may check attributes and/values of the event records against reputation data. The reputation verification system may assign a threat vector to an event record in step 232 if the reputation data meets an alert threshold. In some embodiments, the reputation verification may assign one threat vector to the event record if the reputation data meets an alert threshold and a different threat vector if the reputation data does not meet the alert threshold. Once a threat vector is assigned, the threat vector may be sent to step 106, illustrated in FIG. 1. Examples of the reputation verification system include Amazon Alexa, VirusTotal, any other host, IP, or file reputation website, combinations thereof, or the like.

In step 240, the event records are analyzed by a machine learning system. The machine learning system may differ from the attribute tracking system in that the machine learning maintains and analyzes the value of all attributes received, rather than simply tracking a count or statistical representation. The machine learning system may include a filter which normalizes incoming data to ensure that variation of the same value has the same representation. Each time that a specified attribute-value pairing is detected, the attribute and/or value may be stored. A threat vector may be assigned to an event record depending on the attributes and/or values stored for that event record and sent to step 106. For example, the machine learning system may assign a threat vector to an event record in step 242 if the event record is statistically outside of a learned curve established by the machine learning system and the threat vector may be sent to step 106.

In step 250, the event records are analyzed by a custom rule vector system. The custom rule vector system may be assigned custom code which allows a user to calculate their own threat vectors. Users may have distinct matches or algorithms that they use to detect relevant known threats. The user may define a hook which adds logic to incoming event records. The hook may include a step which produces the threat vector. If an event record matches a user-defined rule, a threat vector may be assigned to the event record in step 252. The threat vector resulting from the custom rule vector system may be sent to step 106.

In step 260, the event records are analyzed by an artificial intelligence system. The artificial intelligence system may assign threat vectors to the event records based on the likelihood of the event being received. The artificial intelligence system may track attributes and/or values of incoming event records and provide a model of the likelihood that a received event was expected. In some embodiments, event records may be assigned a threat vector if the received event was sufficiently statistically unlikely (e.g., there is a one percent or lower chance of the event record occurring) in step 262. In further embodiments, the event records may be assigned threat vectors proportional to the likelihood of the event occurring. The threat vector resulting from the artificial intelligence system may then be sent to step 106.

According to method 200, each of the event records may be analyzed by any or all of the systems described above (e.g., the intrusion system, the attribute tracking system, the reputation verification system, the machine learning system, the custom rule vector system, and the artificial intelligence system), as well as other systems known in the art. In some embodiments, the event records may be analyzed by certain steps of the method 200 depending on attributes and/or values contained within the event records. As such, threat vectors are assigned to each of the event records received in the timeframe.

Returning to FIG. 1, in step 106, threat vectors associated with each of the event records are merged or superimposed with the respective event records to generate risk events (sometimes referred to as security events). The risk events may contain parts of the original attribute-value pairings from the respective event records. The risk events may further contain vector types and vector values. Each of the risk events may include a unique key (e.g., a destination address and a source address), as discussed above for the event records.

Figure 3:
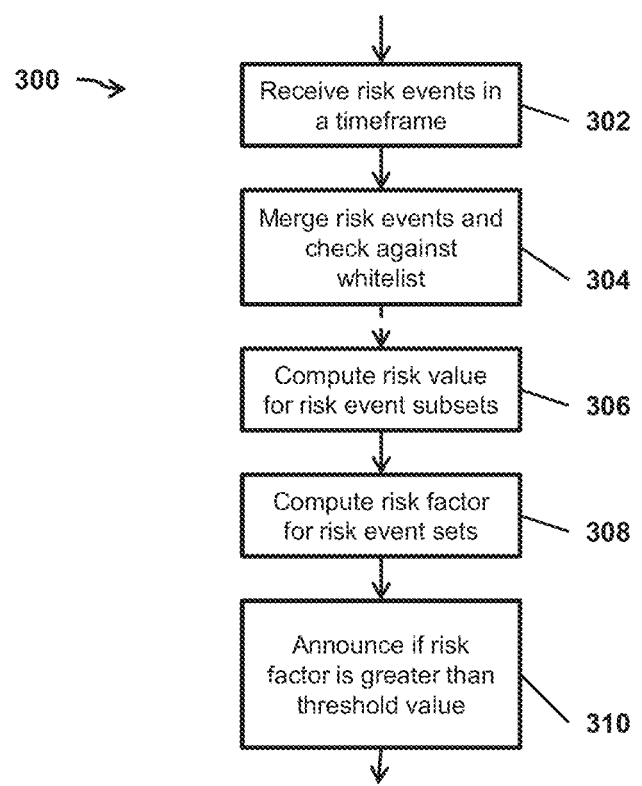
FIG. 3 is a flow diagram of a step of the method for evaluating events in accordance with an embodiment.

In step 108, the threat vectors are used to calculate a risk value for each of the risk events. FIG. 3 illustrates a method 300 providing details for step 108 of the method 100. In some embodiments, the steps of the method 300 may be carried out by a set management system. In step 302, the set management system receives the risk events in a time frame, including any associated threat vectors established by the method 200. It is common for a single risk event to have multiple threat vectors associated therewith; however, the event records may have any number of threat vectors associated therewith.

FIG. 3 provides the steps for the Set Management methods (step 300). This method receives announcements from step 200. It is common to have multiple announcements associated with a single event record. Set Management method updates the orthogonal value of the event record (FIG. 6), and then inserts the event record into its subset. The subset is updated, and a new joint-distribution probability is computed. This in turn updates the parent sets value. When the threshold is met, Set Management makes an announcement to notification (step 108).

In step 304, the risk events are merged with related risk events and any whitelisted threat vectors are removed. In some embodiments, the risk events may be grouped and/or merged into subsets and sets. Each of the risk events in a subset may share a secondary key (e.g., a destination address) and each of the risk events in a set may share both a secondary key and a primary key (e.g., a source address). The merged risk events are then checked against a whitelist to prevent action on and reporting of events known to be safe. The whitelist may be configured by the user or may be part of machine-learned feedback.

In step 306, each of the risk event subsets is assigned a risk value. The risk values may represent the joint-distribution probability of the threat factors associated with each respective risk event subsets. Each of the threat vectors may include their own merge logic to ensure that the same risks are not accounted for multiple times in calculating the risk value. For example, if multiple threat vectors based on a domain address are merged to a risk event subset having a unique key which is the same domain address, only one of the threat vectors will be used in calculating the risk value.

Risk event subsets associated with an N-dimension threat vector receive a boost of $2^{(N-1)}$ in their risk values. This boost may be configurable and may be enhanced by machine-learned feedback.

In step 308, each of the risk event sets is assigned a risk value. This risk value may also be referred to as a risk factor. The risk factor of each risk event set may be calculated using a joint-distribution probability of the risk values for any associated risk event subsets.

In step 310, the value of each of the risk factors is compared with a threshold value. If the value of a risk factor is greater than the threshold value, an announcement is sent to step 108 of the method 100.

Returning to FIG. 1, once the risk factors are calculated for each of the risk events in step 108, the risk factors are compared with a threshold value. If the risk factors exceed the threshold value, a notification may be displayed to a user. The threshold value may be defined by the user, or may be set by machine-learned feedback. In some embodiments, only the top M risk events having the highest risk factors may be displayed to the user in a timeframe (e.g., a sliding window). Each of the risk events may include a unique IP address (e.g., the victim's IP address), a risk factor, and vectors of all threat vectors and risk events. This enables the user to adjust the alert-to-risk factor mapping, based on alert identifiers, alert categories and/or alert descriptions.

Figure 4:
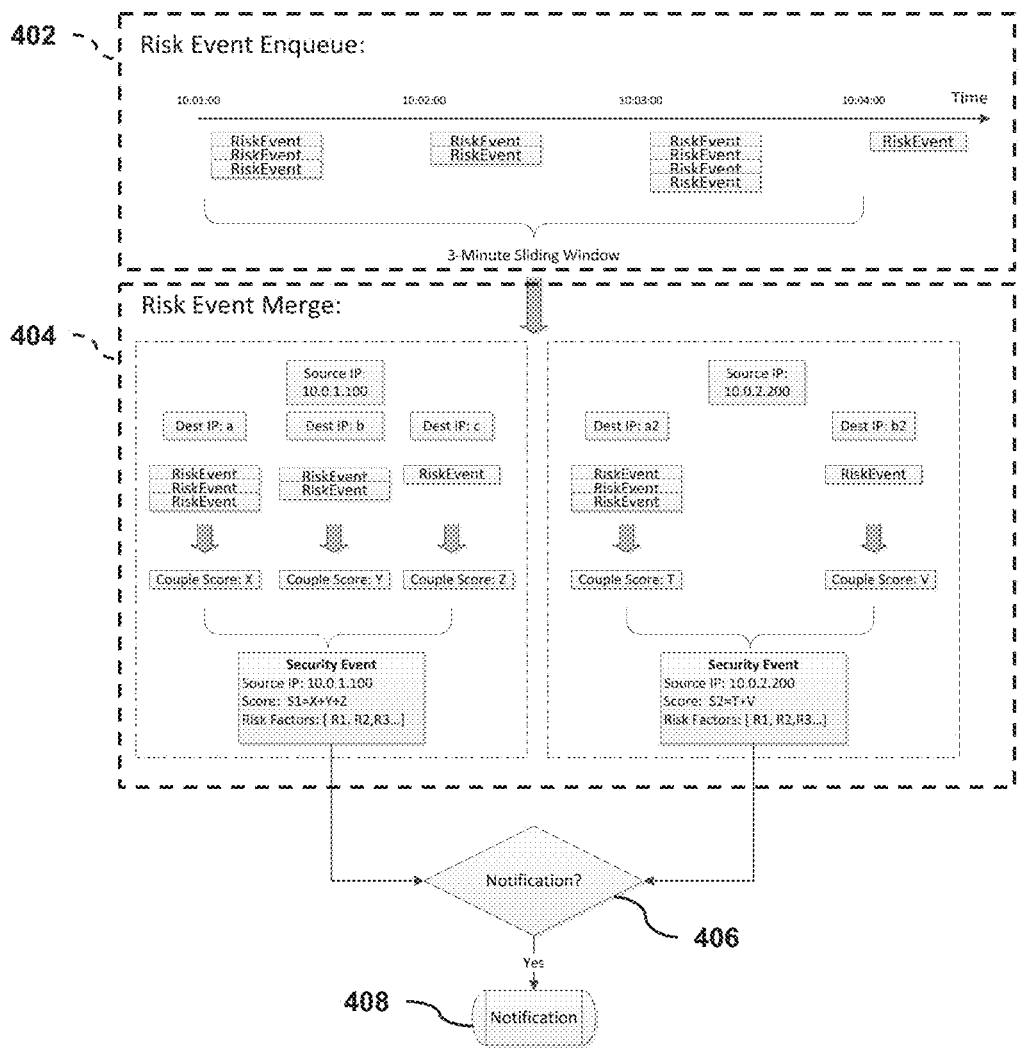
FIG. 4 is a flow diagram of a step of the method for evaluating events in accordance with an embodiment.

FIG. 4 illustrates an example of the risk event assessment stage (e.g., steps 306-310 of FIG. 3) of the set management system in accordance with a representative embodiment. These steps may be the same as, or similar to those illustrated in FIG. 3; however, FIG. 4 provides additional graphical clarity as to how the records relate to each other in a memory of the system. In step 402, a plurality of risk events is queued in a time frame. According to an embodiment, the time frame may be a predetermined period of time. For example, the time frame may be 3 minutes. According to various other embodiments, the time frame may be 10 seconds, 30 seconds, 1 minute, 2 minutes, 5 minutes, or any other period of time. Alternatively, the time frame may comprise a sliding window. The length of the window may be defined as a predetermined time or a predetermined number of risk events.

In step 404, risk events having the same key are merged (e.g., superimposed, combined, united, or joined). A risk value is generated for each of the risk events based on threat vectors assigned to the risk event. Each risk value is merged (i.e., superimposed, combined, united, or joined) to the associated risk event to form a plurality of security events. Risk factors may be calculated for each of the security events based on the risk values for any associated risk events. Each security event may include risk events having the same key, threat vectors associated with the risk events, risk values associated with the threat vectors, and a risk factor.

In merging the risk events, the risk events may be merged based on the source IP address (referred to as a parent set). The risk events may be further merged by destination IP address (referred to as a subset). Threat vectors associated with risk events having the same source IP address and destination IP address will be merged into a single risk event.

In step 406, a decision is made whether to notify a user of each of the security events. A user may be notified of a security event if the risk factor is greater than a predetermined value. Alternatively or additionally, the user may be notified of the top-M security events having the greatest risk factors. According to at least one embodiment, the user may be notified of the top-5 security events.

Figure 5:
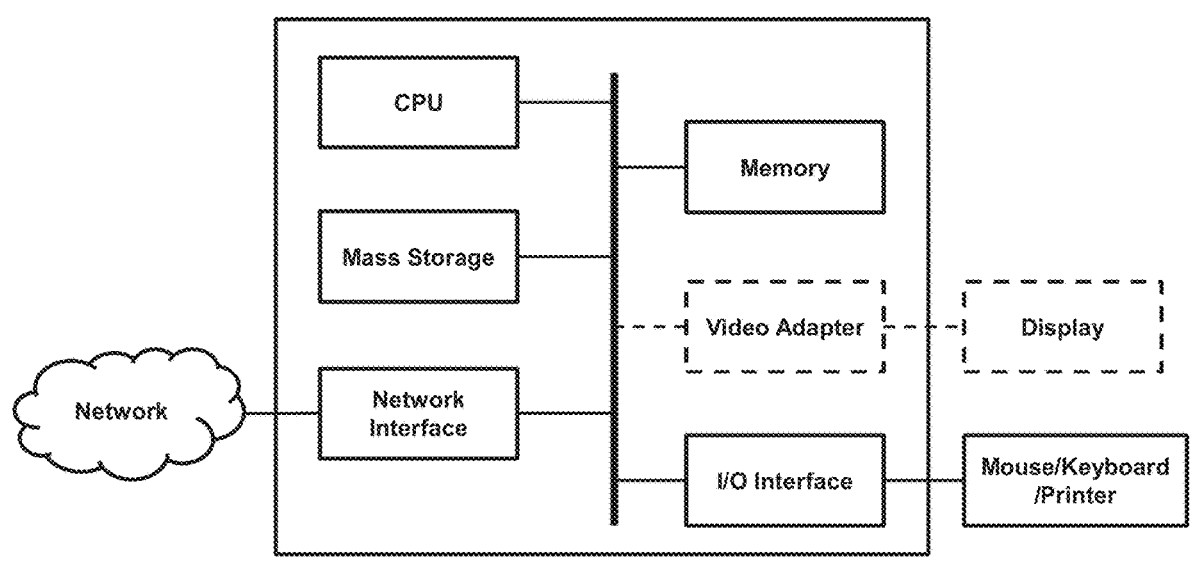
FIG. 5 is a block diagram of a device in accordance with an embodiment.

FIG. 5 illustrates a block diagram of a device that may be used for implementing the previously described methods and embodiments in accordance with a representative embodiment. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like. The mass storage device may be used to store a plurality of security events, a plurality of records, a plurality of risk events, a combination thereof, or the like, as previously described.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

The processing unit may be used to form a plurality of security events, as described above. For example, the processing unit may be used to merge each event having the same key (i.e., IP-couple) to form a plurality of records. The processing unit may merge a plurality of risk factors to each record of the plurality of records. The processing unit may merge a risk score to each of the records based on the risk factors merged to that record to form a plurality of security events.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
receiving a plurality of records in a first timeframe;
parsing each record of the plurality of records;
sending each record of the plurality of records to one or more threat vector calculators;
establishing a plurality of threat vectors for each record of the plurality of records, wherein the one or more threat vector calculators establish the plurality of threat vectors;
merging the plurality of threat vectors to each record of the plurality of records;
grouping each record of the plurality of records sharing a destination address into a plurality of subsets;
generating a risk valuation for each subset of the plurality of subsets based on the plurality of threat vectors;
merging the risk valuation to each subset of the plurality of subsets to form a plurality of risk events;
grouping each subset of the plurality of subsets sharing a source address into a plurality of sets, wherein a risk factor is assigned to each set of the plurality of sets; and
storing the plurality of sets in a computer-readable data store.

2. The method of claim 1, wherein the record comprises a derived key.

3. The method of claim 2, wherein the derived key is a source IP, a destination IP, a protocol, or a combination thereof.

4. The method of claim 3, wherein the record comprises a plurality of events and attribute-value pairs in the first timeframe which share the derived key.

5. The method of claim 4, wherein the plurality of threat vectors comprises statistics evaluations, flow anomalies, reputation information, alerts based on other network security systems, or a combination thereof.

6. The method of claim 5, further comprising notifying a user of a respective set of the plurality of sets if the risk factor of the respective set is above a predetermined threshold value.

7. The method of claim 6, further comprising optimizing each threat vector of the plurality of threat vectors based on machine learning.

8. The method of claim 7, wherein the risk valuation corresponds to a joint-distribution probability of the threat vectors merged to the record.

9. A device comprising:
a system that receives or retrieves a plurality of events in a sliding window from a plurality of network security systems;
a processor that forms a plurality of sets by:
merging each event sharing an IP-couple-pair into a record to form a plurality of records;
distributing each record of the plurality of records to a plurality of threat valuation systems;
merging a plurality of threat factors to each record of the plurality of records;
grouping each record of the plurality of records sharing a destination address into a plurality of subsets;
merging a risk score to each subset of the plurality of subsets based on the threat factors present in the respective subset of the plurality of subsets to form a plurality of security events; and
grouping each subset of the plurality of subsets sharing a source address into a plurality of sets, wherein a risk factor is assigned to each set of the plurality of sets; and
a computer readable data store that stores the plurality of sets.

10. The device of claim 9, wherein each of the events has a source IP and a destination IP, and wherein events having the same source IP and the same destination IP have a same IP-couple-pair.

11. The device of claim 10, further comprising a monitor adapted to display the plurality of security events.

12. The device of claim 11, wherein the monitor displays a predetermined number of the security events of the plurality of security events, each of the predetermined number of the security events having the highest risk score and being sorted by risk score.

13. The device of claim 12, wherein the monitor displays the record, the IP-couple-pair, the risk score, the plurality of threat factors, or a combination thereof for each security event of the predetermined number of the security events.

14. A method comprising:
receiving a plurality of records;
establishing a threat vector for each record of the plurality of records;
merging the threat vector to each record of the plurality of records;
grouping each record of the plurality of records sharing a destination address into a plurality of subsets;
generating a risk valuation for each subset of the plurality of subsets based on the threat vectors;
merging the risk valuation to each subset of the plurality of subsets to form a plurality of risk events;
grouping each subset of the plurality of subsets sharing a source address into a plurality of sets, wherein a risk factor is assigned to each set of the plurality of sets;
providing a notification if the risk factor is above a threshold value.

15. The method of claim 14, further comprising storing the plurality of risk events in a computer-readable data store.

16. The method of claim 14, further comprising:
receiving a first event; and
deriving a key for the first event, the key comprising a first source IP and a first destination IP, wherein the record comprises the first event and the key.

17. The method of claim 16, further comprising:
receiving a second event;
deriving the key for the first event, the key comprising the first source IP and the first destination IP; and
superimposing the second event into the record.

18. The method of claim 14, wherein the record comprises a plurality of events and attribute-value pairs which share a derived key, the derived key comprising at least one of a source IP, a destination IP, or a protocol.

19. The method of claim 14, further comprising:
increasing a count when an attribute is detected in the record; and
establishing the threat vector when the count reaches a second threshold value.

20. The method of claim 14, further comprising:
increasing a count when an attribute is detected in the record; and
altering the threat vector based on the count.

\* \* \* \* \*